US 8,170,001 B2

(12) United States Patent
Lerzer et al.

(10) Patent No.: US 8,170,001 B2
(45) Date of Patent: May 1, 2012

(54) TECHNIQUE FOR SYNCHRONIZING NETWORK ACCESS MODULES IN A MOBILE COMMUNICATION DEVICE

(75) Inventors: Jürgen Lerzer, Neumarkt/Opf (DE); Stefan Meyer, Hoechstadt (DE)

(73) Assignee: Telefonaktiefolaget LM Ericsson (publ), Stockholm (SE)

( * ) Notice: Subject to any disclaimer, the term of this patent is extended or adjusted under 35 U.S.C. 154(b) by 309 days.

(21) Appl. No.: 12/644,729

(22) Filed: Dec. 22, 2009

(65) Prior Publication Data

US 2010/0165975 A1      Jul. 1, 2010

Related U.S. Application Data

(60) Provisional application No. 61/147,491, filed on Jan. 27, 2009.

(30) Foreign Application Priority Data

Dec. 23, 2008   (EP) ................................... 08022341

(51) Int. Cl.
*H04J 3/06*       (2006.01)
*H04W 4/00*       (2009.01)
(52) U.S. Cl. ......... 370/350; 370/328; 370/507; 370/509
(58) Field of Classification Search .................. 370/328, 370/350, 503, 507, 509
See application file for complete search history.

(56) References Cited

U.S. PATENT DOCUMENTS 5,903,835 A * 5/1999 Dent .............................. 455/427

FOREIGN PATENT DOCUMENTS

GB         2 343 592 A       5/2000

OTHER PUBLICATIONS

European Search Report mailed Sep. 9, 2009 in corresponding European Application No. EP 08022341.5.

* cited by examiner

*Primary Examiner* — Ronald Abelson
(74) *Attorney, Agent, or Firm* — Nixon & Vanderhye P.C.

(57) ABSTRACT

A technique for synchronizing different network access modules in a mobile communication device is provided. A device embodiment (100) comprises a first network access module (102) having a first radio technology, or RAT, interface (114) and being clocked at a first clock frequency and a second network access module (104) having a second RAT interface (130) and being clocked at a second clock frequency, wherein the first clock frequency is different from the second clock frequency. A method implementation of this technique comprises the steps of generating a clock signal having the first clock frequency, outputting the clock signal for use as a first reference clock signal in the first network access module (102), converting the clock signal to the second clock frequency, and outputting the converted clock signal for is use a second reference clock signal in the second network access module (104).

15 Claims, 6 Drawing Sheets

TECHNIQUE FOR SYNCHRONIZING NETWORK ACCESS MODULES IN A MOBILE COMMUNICATION DEVICE

This application claims priority to European Patent Application No. 08022341-5 filed 23 Dec. 2008 and the benefit of U.S. Provisional Application No. 61/147,491 filed 27 Jan. 2009, the entire contents of each of which are hereby incorporated by reference.

TECHNICAL FIELD

The present invention generally relates to the field of synchronizing network access modules. In particular, the invention relates to a technique for synchronizing in different network access modules in a mobile communication device comprising a first network access module having a first radio access technology (RAT) interface and being clocked at a first clock frequency and a second network access module having a second RAT interface and being clock at a second clock frequency.

BACKGROUND

Multi-RAT mobile communication devices are capable of communicating via different RAT interfaces. For example, most $3^{rd}$ Generation (3G) mobile communication devices are capable of communicating based on the Global System for Mobile Communication (GSM) and the Wideband Code Division Multiple Access (WCDMA) standards. In such multi-RAT mobile communication devices, the different RAT interfaces are typically integrated in one network access module which is implemented as a chip or chip set.

However, the design effort for integrating different RAT interfaces in one network access module is high, in particular since the different RAT interfaces share common resources and have to be adjusted to each other. Furthermore, integrating different RAT interfaces in one network access module lacks flexibility, since for adding an additional RAT interface or replacing one RAT interface with another RAT interface, the chip or chip set has to be designed anew.

Moreover, future RAT interfaces (e.g., according to the Long Term Evolution (LTE) standard) are becoming more and more complex so that it is technically difficult or may even become technically impossible to integrate a future RAT interface with another RAT interface in one network access module.

In order to avoid the design effort and the disadvantages of integrating different RAT interfaces in one network access module, it could be thought about implementing each RAT interface in a separate network access module in the mobile communication device, as is known, for example, from US 2007/0173283 A1. For such an implementation, the need to synchronize the separate network access modules arises.

SUMMARY

Accordingly, there is a need for a technique for synchronizing two or more network access modules in a mobile communication device which is avoiding at least some of the disadvantages outlined above.

This need is satisfied according to a first aspect by a method for synchronizing different network access modules in a mobile communication device comprising a first network access module having a first RAT interface and being clocked at a first clock frequency and a second network access module having a second RAT interface and being clocked at a second clock frequency, wherein the first clock frequency is different from the second clock frequency. The method comprises the steps of generating a clock signal having the first clock frequency, outputting the clock signal for use as a first reference clock signal in the first network access module, converting the clock signal to the second clock frequency, and outputting the converted clock signal for use as a second reference clock signal in the second network access module.

The reference clock signals for the first and the second network access module may be derived from the same clock signal source. Thereby, the first and the second network access modules can be synchronized with each other so that a secure and stable communication of the mobile communication device is ensured.

The first and the second RAT interfaces may be components that enable communication of the mobile communication device with at least one access network. In one implementation, each RAT interface is capable of communicating with at least one kind of access network. The individual network access modules may be realized in various ways. In one implementation, at least one of the modules is realized in the form of a delimitated chip or chip set. The delimitated chip or chip set may comprise Radio Frequency (RF) components tailored to support the respective RAT interface and, additionally or alternatively, a digital baseband (DBB) processor adapted to perform baseband processing operations for the respective RAT. In one variation, at least one of the network access modules and RAT interfaces may comprise or may be constituted by an Application Specific Integrated Circuit (ASIC), a Digital Signal Processor (DSP) or a Field Programmable Gate Array (FPGA).

In accordance with the paradigm of modularity, at least one of the network access modules may be configured to be re-useable either in a stand-alone configuration or in a dual (or triple, etc.) mode configuration. In a multi-mode configuration, two or more modules may be co-located within one and the same hardware device and may be provided with optional inter-module data and/or inter-module control interfaces.

According to one aspect, the method comprises the step of tuning the clock signal having the first clock frequency to become synchronized with a network clock signal, wherein in case the first RAT interface of the first network access module is active, the network clock signal is a network clock signal received via the first RAT interface, and in case the second RAT interface of the second network access module is active, the network clock signal is a network clock signal received via the second RAT interface.

An active RAT interface means that communication via the RAT interface and at least one antenna of the mobile communication device is possible so that data may be received from and transmitted to a mobile communication network. This may comprise that the RAT interface is connected to an access network. An active RAT interface may additionally, or in the alternative, comprise that measurement and/or synchronization signals can be communicated via the RAT interface.

The network clock signals may be received from the mobile communication networks in communication with the first and the second RAT interfaces. By providing a selective tuning depending on which one of the first and the second RAT interface is active, a stable communication of the mobile communication device can be provided. In this case, it may be further provided that only one of the first RAT interface and the second RAT interface is active (e.g., connected to an access network) at the same time.

For effectively tuning the clock signal having the first clock frequency depending on which one of the first and the second RAT interface is active, the method may further comprise the steps of obtaining first frequency tuning commands from the first network access module, obtaining second frequency tuning commands from the second network access module and selectively using the first or the second frequency tuning commands for the tuning of the dock signal.

Since the first clock frequency is different from the second clock frequency, it may not be possible to directly use frequency tuning commands obtained from the second network access module for the tuning of the clock signal having the first clock frequency. Therefore, the method may comprise the steps of obtaining first frequency tuning commands relating to the first clock frequency from the first network access module, obtaining third frequency tuning commands relating to the second clock frequency from the second network access module, converting the third frequency tuning commands to second frequency tuning commands relating to the first clock frequency and selectively using the first or the second frequency tuning commands for the tuning of the clock signal. The frequency tuning commands may be voltage values. Thus, the tuning of the clock signal may be voltage controlled.

For converting the third frequency tuning commands to the second frequency tuning commands, a linear function and/or a look-up table may be used. In particular, the linear function may be used for controlling the tuning in a linear range and the look-up table may be used for controlling the tuning in a non-linear range.

For providing that the tuning of the clock signal having the first clock frequency is always directed to a synchronization with a network clock signal relating to the active one of the first and the second RAT interfaces, the method may further comprise the steps of determining whether one of the first and the second RAT interface is active, using the first frequency tuning commands for the tuning of the clock signal when it has been determined that the first RAT interface is active, and using the second frequency tuning commands for the tuning of the clock signal when it has been determined that the second RAT interface is active.

To ensure that the clock signal having the first clock frequency is always tuned to become synchronized with a network clock signal relating to an active RAT interface, the method may further comprise the step of obtaining control commands for controlling the selective usage of the first or second frequency tuning commands from the first network access module. In particular, the control commands may be obtained from a baseband signal processing stage provided in or attached to the first network access module or an RF signal processing stage provided in or attached to the first network access module.

According to a further aspect, the selective tuning of the clock signal having the first clock frequency may be used during an inter-RAT handover between the first and the second network access module. Thus, the first and the second network access module are always synchronized when both network access modules are active. This synchronization can be ensured since both the first and the second network access module derive their reference clocks signals from the same clock source.

Further to the selective tuning when both network access modules are active, a coarse-tuning of at least one of the clock signal having the first clock frequency and the converted clock signal having the second clock frequency may be performed during a start-up phase of the mobile communication device. The coarse-tuning may be based on pre-set calibration values. The start-up phase may comprise a switching-on of the mobile communication device and a switching from an airplane mode (in which no RAT interface is active and a clock signal may be derived from a further clock source) to a normal operation mode (in which at least one of the first and the second RAT interface may become active).

The clock signal having the first clock frequency may also be used in the first network access module when the second RAT interface is active. In this case, inter-RAT measurements may be performed by or in the first network access module by using the clock signal which has been tuned to the network clock signal received via the second RAT interface. For performing the inter-RAT measurements, the first RAT interface may be active. Such inter-RAT measurements may comprise measurements of cells belonging to the first RAT interface, e.g. measurements on downlink physical channels belonging to the first RAT interface. For 3G Partnership Project (3GPP) mobile communication standards, various kinds of inter-RAT measurements are standardized in the 3GPP specifications.

In order to ensure that only one of the first and the second RAT interface is active (e.g., connected to an access network) at a given point of time in case the first and the second network access module share at least one antenna, the method may further comprise the step of switching between a connection of the first network access module to the at least one antenna and a connection of the second network access module to the at least one antenna.

As for a first hardware aspect, a frequency oscillator unit is provided. The frequency oscillator unit comprises a generating unit capable of generating a clock signal having a first clock frequency, a first outputting unit capable of outputting the clock signal for use as a first reference clock signal in a first network access module having a first RAT interface and being clocked at the first clock frequency, a converting unit capable of converting the clock signal to a second clock frequency and a second outputting unit capable of outputting the converted clock signal for use as a second reference clock signal in a second network access module having a second RAT interface and being clocked at the second clock frequency. The generating unit may comprise a combination of an integrated oscillator circuit and a crystal. The converting unit may comprise a Phase-Locked Loop (PLL) circuit. The frequency oscillator unit may further comprise a tuning unit capable of tuning the clock signal to become synchronized with a network clock signal received via one of the first and the second RAT interface. Moreover, the frequency oscillator unit may comprise a switching unit for selectively switching first or second frequency tuning commands to the tuning unit. The switching unit may comprise a multiplexer unit. The frequency oscillator unit may also comprise a conversion logic for converting third frequency tuning commands relating to the second clock frequency to the second frequency tuning commands relating to the first clock frequency.

As for a second hardware aspect, a network access module comprising a frequency oscillator unit is provided. As for a third hardware aspect, a mobile communication device comprising a first network access module, a second network access module and a frequency oscillator unit is provided.

The mobile communication device may be a mobile telephone, a Personal Digital Assistant (PDA), a network card or any other mobile communication apparatus which is capable of communicating via an air interface.

BRIEF DESCRIPTION OF THE DRAWINGS

In the following, the invention will be described with reference to exemplary embodiments illustrated in the drawings, wherein.

DETAILED DESCRIPTION

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to network access modules which are working according to the CDMA and LTE standards, it will be apparent to the skilled person that the invention can also be practiced in context with network access modules which are working in accordance with other mobile communication standards, e.g., the Enhanced Data Rate for GSM Evolution (EGDE), the High Speed Packet Access (HSPA) or any Wireless Local Area Network (WLAN) standard. Moreover, while the embodiments will be described with clock frequencies of 19.2 MHz and 26 MHz, it will be apparent to the skilled person that the invention can also be practiced in context with other clock frequencies.

Figure 1:
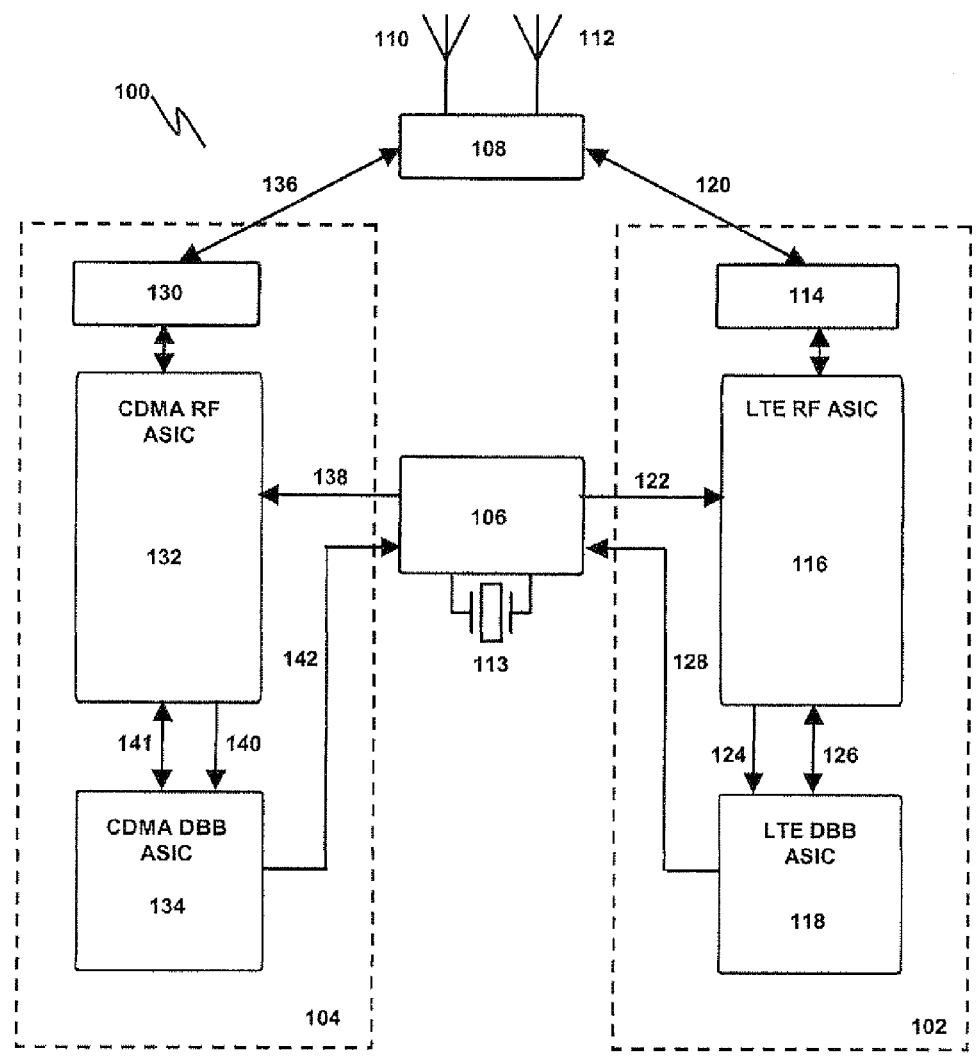
FIG. 1 is a schematic block diagram illustrating an embodiment of a mobile communication device.

FIG. 1 shows a schematic block diagram illustrating an embodiment of a mobile communication device 100.

The mobile communication device 100 comprises an LTE network access module 102 which is working in accordance with the LTE standard, a CDMA network access module 104 which is working in accordance with a CDMA standard (e.g., WCDMA), a frequency oscillator unit 106 which in this embodiment is provided between the LTE network access module 102 and the CDMA network access module 104, an antenna switch 108 and antennas 110 and 112. For generating a 26 MHz clock signal, the frequency oscillator unit 106 is connected to a crystal 113.

The LTE network access module 102 is clocked at 26 MHz and the CDMA network access module 104 is clocked at 19.2 MHz. Moreover, the LTE network access module 102 and the CDMA network access module 104 are provided in this embodiment as separate chips or chip sets. Since both network access modules 102 and 104 are provided as separate chips or chip sets, it is possible to combine an already existing network access module with a newly developed network access module in a mobile communication device. However, the present technique for synchronizing network access modules is not limited to separate chips or chip sets.

The LTE network access module 102 comprises an LTE RAT interface 114, an LTE RF signal processing stage 116 which is implemented in this embodiment as an LTE RF ASIC, and an LTE baseband signal processing stage 118 which is implemented as an LTE DBB ASIC. According to another embodiment, the LTE RF signal processing stage 116 may also be implemented as one or more RF ASICs plus additional RF components. The LTE baseband signal processing stage 118 may also comprise application processor functionalities. The LTE RAT interface 114 provides a connection 120 to the antenna switch 108 so that communication via the antennas 110 and 112 is possible.

The LTE network access module 102, i.e. the LTE RF ASIC 116, receives via connection 122 a 26 MHz clock signal from the frequency oscillator unit 106. The LTE network access 102 uses the 26 MHz clock signal as a reference clock signal. The 26 MHz clock signal is further provided by LTE RF ASIC 116 to LTE DBB ASIC 118, as indicated by arrow 124. Moreover, a control interface 126 is provided between LTE RF ASIC 116 and LTE DBB ASIC 118.

The LTE DBB ASIC 118 receives via antennas 110, 112, antenna switch 108 and LTE RAT interface 114 LTE network clock signals from an LTE mobile communication network (not shown). Based on the received LTE network clock signals, the LTE DBB ASIC 118 generates 26 MHz frequency tuning commands and provides the 26 MHz frequency tuning commands via connection 128 to the frequency oscillator unit 106.

Similar to the LTE network access module 102, the CDMA network access module 104 comprises a CDMA RAT interface 130, a CDMA RF signal processing stage 132 which is implemented in this embodiment as a CDMA RF ASIC, and a CDMA baseband signal processing stage 134 which is implemented as a CDMA DBB ASIC. According to another embodiment, the CDMA RF signal processing stage 132 may also be implemented as one or more RF ASICs plus additional RE components. The CDMA baseband signal processing stage 134 may also comprise application processor functionalities. The CDMA RAT interface 130 provides a connection 136 with the antenna switch 108 so that communication of the CDMA network access module 104 via the antennas 110 and 112 with a CDMA mobile communication network (not shown) is possible.

The CDMA RE ASIC 132 receives via connection 138 a 19.2 MHz clock signal from frequency oscillator unit 106. The 19.2 MHz clock signal is provided via connection 140 to CDMA DBB ASIC 134. A control interface 141 is further provided between CDMA RE ASIC 132 and CDMA DBB ASIC 134.

The CDMA DBB ASIC 134 receives via antennas 110, 112, antenna switch 108 and COMA RAT interface 130 CDMA network clock signals from the CDMA mobile communication network. Based on the CDMA network clock signals, the CDMA DBB ASIC 134 generates 19.2 MHz frequency tuning commands and provides them via connection 142 to frequency oscillator unit 106.

The antenna switch 108 provides a selective connection of either the LTE network access module 102 or the CDMA network access module 104 to the antennas 110 and 112. In the present embodiment, the antenna switch 108 is controlled by the LTE DBB ASIC 118.

Further to the 26 MHz frequency tuning commands, the LTE DBB ASIC 118 provides switching commands via connection 128 to frequency oscillator unit 106. The switching commands are for switching of a usage of either the frequency tuning commands generated by CDMA DBB ASIC 134 and provided via connection 142 to the frequency oscillator unit 106 or the frequency tuning commands generated by LTE DBB ASIC 118 and provided via connection 128 to the frequency oscillator unit 106 for a frequency tuning performed at the frequency oscillator unit 106.

Although the LTE the network access module 102, the CDMA network access module 104, the frequency oscillator unit 106, the crystal 104 and the antenna switch 108 are shown in FIG. 1 as separate units, at least one of the crystal 144, the antenna switch 108 and the frequency oscillator unit 106 or any of its components may be integrated in either the LTE network access module 102 or the CDMA network access module 104. Moreover, the LTE RAT interface 114 may be integrated in any component of the LTE network access module 102 and the CDMA RAT interface 130 may be integrated in any component of the CDMA network access module 104.

An embodiment of the structure and the function of the frequency oscillator unit 106 will now be explained with reference to FIG. 2.

Frequency oscillator unit 106 comprises an oscillator circuit 146 which is coupled to the external crystal 113. The oscillator circuit 146 together with the crystal 113 generate a 26 MHz clock signal which is provided to a first outputting unit 148. The first outputting unit 148 outputs the 26 MHZ clock signal via connection 122 to LTE RF ASIC 116 (see FIG. 1). Furthermore, the 26 MHZ clock signal generated by oscillator circuit 146 is provided to a conversion unit 150 which converts the 26 MHZ clock signal to a 19.2 MHz clock signal. The converted 19.2 MHz clock signal is thereafter provided to a second outputting unit 152 which is providing the converted 19.2 MHz clock signal via connection 138 to CDMA RF ASIC 132 (see FIG. 1). The converting unit 150 is in this embodiment implemented as a PLL circuit.

The frequency oscillator unit 106 further comprises a switching unit 154, a conversion logic 156 and a tuning unit 157. The switching unit 154 receives 26 MHz frequency tuning commands via connections 128 and 158 from LTE DBB ASIC 118. Furthermore, conversion logic 156 receives 19.2 MHz frequency tuning commands via connection 142 from CDMA DBB ASIC 134. The conversion logic 156 converts the 19.2 MHz frequency tuning commands to 26 MHz frequency tuning commands. The converted 26 MHz frequency tuning commands are provided via connection 160 to switching unit 154.

The switching unit 154 further receives switching control commands via connections 128 and 162 from LTE DBB ASIC 118 for selectively switching one the frequency tuning commands generated by LTE DBB ASIC 118 and the converted frequency tuning commands derived from CDMA DBB ASIC 134 to the tuning unit 157. Thus, the LTE DBB ASIC 118 controls which one of the 26 MHz frequency tuning commands is provided via tuning unit 157 to oscillator circuit 146 for tuning the 26 MHz clock signal. The 26 MHz and 19.2 MHz frequency tuning commands may be voltage values.

Alternatively to providing the switching control commands by the LTE DBB ASIC 118, the switching control commands may also be provided by at least one of the CDMA DBB ASIC 134, the CDMA RF ASIC 132 and the LTE RF ASIC 116. For this, an interface may be provided between the LTE RF ASIC 116 and the LTE DBB ASIC 118 and the switching control commands may be provided by the LTE DBB ASIC 118 to the LTE RF ASIC 116. An interface may also be provided between the CDMA RF ASIC 132 and the CDMA DBB ASIC 134 and switching control commands may be provided by the CDMA DBB ASIC 134 to the CDMA RF ASIC 132.

Figure 2:
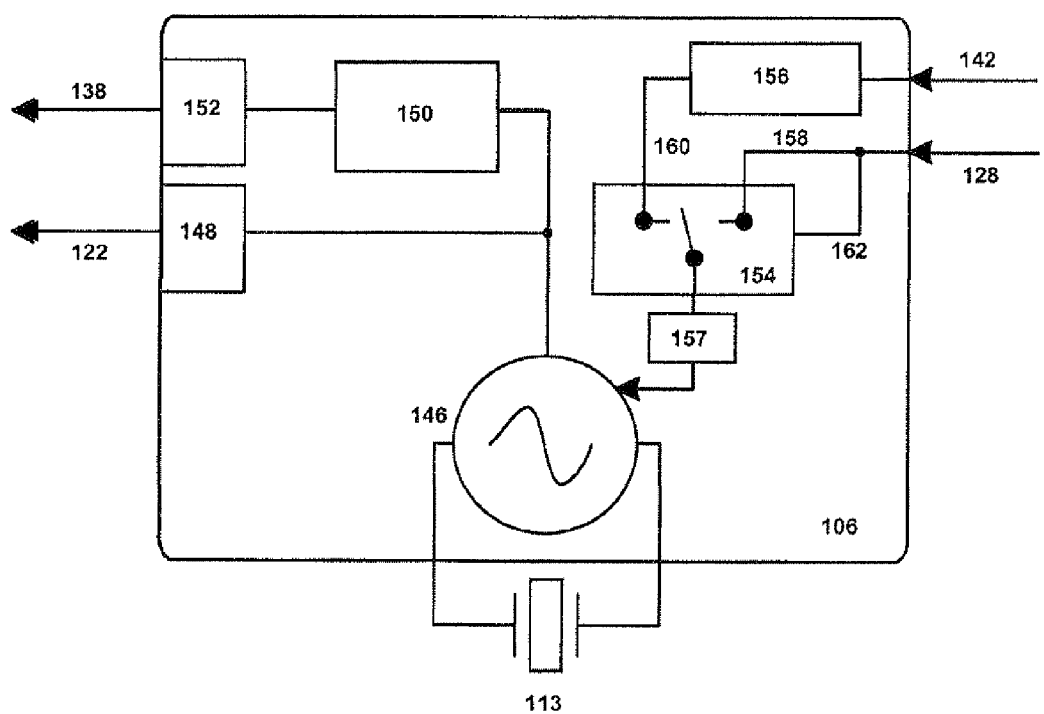
FIG. 2 is a schematic block diagram illustrating an embodiment of a frequency oscillator unit.
Figure 3:
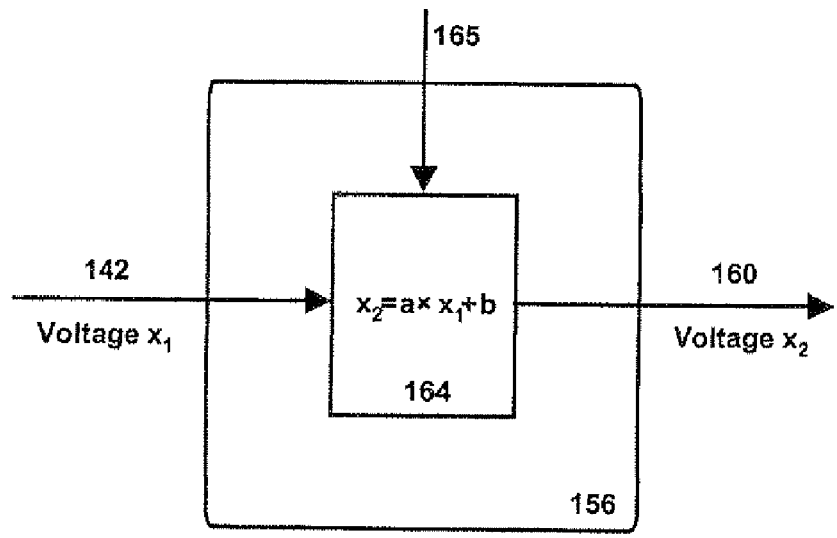
FIG. 3 is a schematic block diagram illustrating a first embodiment of a conversion logic.

FIG. 3 shows a schematic block diagram illustrating a first embodiment of a conversion logic 156. The conversion logic 156 will be described with reference to the frequency oscillator unit 106 shown in FIGS. 1 and 2.

In this embodiment, it is assumed that the tuning of the oscillator circuit 146 by the tuning unit 157 is voltage controlled based on absolute voltage delta values. For this, the tuning unit 158 applies a certain voltage value x to the oscillator circuit 146 so that the output frequency of the oscillator circuit 146 changes by a defined frequency offset y=f(x).

It is further assumed that a function $f_1(x_1)$ specifying a mapping of a voltage value to a frequency offset for the 19.2 MHz clock signal at the oscillator circuit 146 and a function $f_2(x_2)$ specifying a mapping of a voltage value to a frequency offset for the 26 MHz clock signal at the oscillator circuit 146 are linear functions within the control range of the oscillator circuit 146.

The conversion logic 156 comprises an analogue circuit 164 which converts voltage values 142 to voltage values 160. For this, the analogue circuit 164 uses a linear function $$x_2 = a \times x_1 + b \tag{1}$$

which converts an input voltage level $x_1$ to an output voltage level $x_2$. In order to make the analogue circuit 164 configurable, the conversion logic 156 further comprises an interface 165 which supplies the values a and b of function (1).

Figure 4:
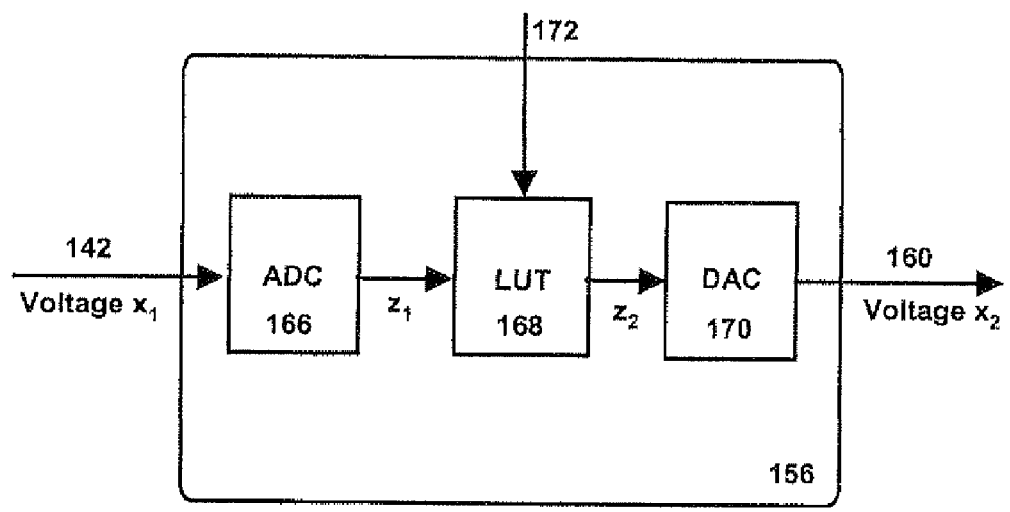
FIG. 4 is a schematic block diagram illustrating a second embodiment of a conversion logic.

FIG. 4 shows a schematic block diagram illustrating a second embodiment of a conversion logic 156. The conversion logic 156 will be described with reference to the frequency oscillator unit 106 shown in FIGS. 1 and 2.

In this embodiment, it is assumed that the tuning of the oscillator circuit 146 by the tuning unit 157 is voltage controlled based on absolute voltage delta values. For this, the tuning unit 158 applies a certain voltage value x to the oscillator circuit 146 so that the output frequency of the oscillator circuit 146 changes by a defined frequency offset y=f(x).

It is further assumed that a function $f_1(x_1)$ specifying a mapping of a voltage value to a frequency offset for the 19.2 MHz clock signal at the oscillator circuit 146 and a function $f_2(x_2)$ specifying a mapping of a voltage value to a frequency offset for the 26 MHz clock signal at the oscillator circuit 146 are non-linear functions within the control range of the oscillator circuit 146.

The conversion logic 156 comprises an Analogue-to-Digital Converter (ADC) 166, a Look-Up Table (LUT) 168 and a Digital-to-Analogue Converter (DAC) 170. ADC 166 converts the 19.2 MHz frequency tuning commands provided via connection 142, i.e., an input voltage level $x_1$, to a digital value $z_1$. Thereafter, LUT 168 maps the digital value $z_1$ to a digital value $z_2$. This mapping is provided in accordance with mapping rules stored in LUT 168. The mapping rules stored in LUT 168 take the functions $f_1(x_1)$ and $f_2(x_2)$ into consideration and are provided via interface 172 to LUT 168 so that LUT 168 is individually configurable. Subsequently, DAC 170 converts the digital value $z_2$ to the output voltage level $x_2$. Thus, 26 MHz frequency tuning commands are generated which are supplied via connection 160 to the tuning unit 157.

According to an alternative embodiment, the conversion logic 156 shown in FIG. 2 may be removed from the frequency oscillator unit 106. In this case, the CDMA network access module 104 converts the 19.2 MHz frequency tuning commands to 26 MHz frequency tuning commands. Furthermore, a detection unit (not shown) may be provided which automatically detects which one of the LTE RAT interface 114 and the CDMA RAT interface 130 is active and automatically controls the switching unit 154 depending on which one of the RAT interfaces 114, 130 is active. In case both the LTE RAT interface 114 and the CDMA RAT interface 130 are active, the detection unit may instruct the switching unit 154 to switch to default frequency tuning commands, e.g., the frequency tuning commands generated by LTE DBB ASIC 118.

According to a further alternative embodiment, the oscillator circuit 146 and the crystal 113 generate a 192 MHz clock signal. In this embodiment, the conversion unit 150 converts 19.2 MHz clock signals to 26 MHz clock signals and the conversion logic 156 converts tuning commands for a 26 MHz clock signal to tuning commands for a 19.2 MHz clock signal.

Figure 5:
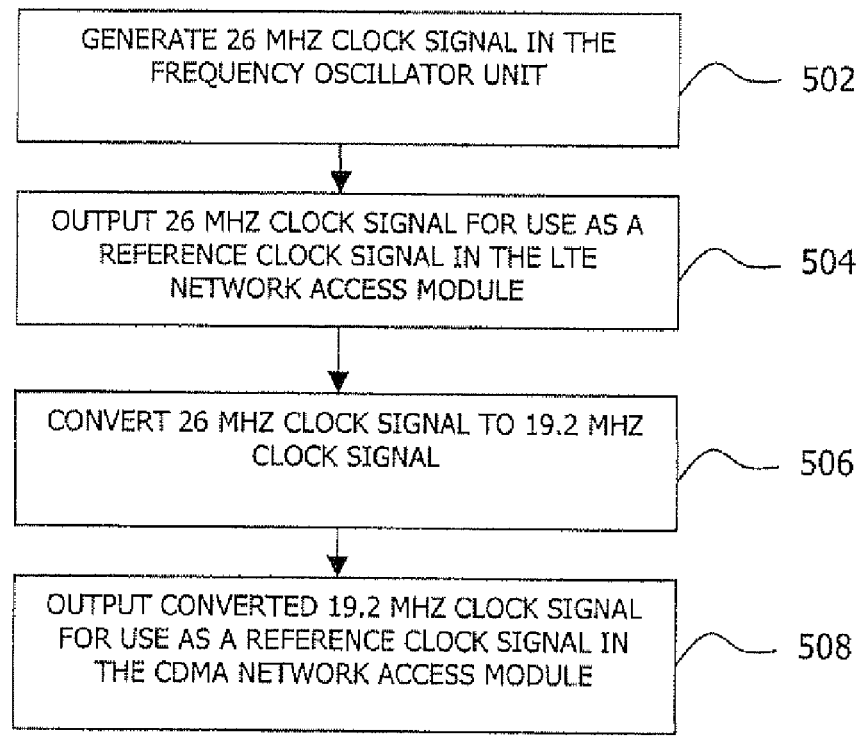
FIG. 5 is a flow chart illustrating an embodiment of a method for synchronizing different network access modules in a mobile communication device.

FIG. 5 shows a flow chart 500 illustrating an embodiment of a method for synchronizing different network access modules in a mobile communication device. The method will be explained with reference to FIGS. 1 and 2.

The method starts in step 502 by generating a 26 MHz dock signal in the oscillator circuit 146. Thereafter, in step 504, the 26 MHz clock signal is outputted via outputting unit 148 to the first network access module 102, i.e., the LTE RF ASIC 116. Accordingly, the 26 MHz clock signal is used as a reference clock signal in the LTE network access module 102.

In step 506, the 26 MHz clock signal is converted by conversion unit 150 to a 19.2 MHz clock signal. Thereafter, in step 508, the converted 19.2 MHz clock signal is outputted by outputting unit 152 to the CDMA network access module 104, i.e., the CDMA RF ASIC 132. Accordingly, the converted 19.2 MHz clock signal is used as a reference clock signal in the CDMA network access module 104.

The method shown in FIG. 5 may be performed during inter-RAT handover between network access modules 102 and 104, for providing inter-RAT measurements and during a start-up phase of the mobile communication device 100. In case of the start-up phase, a method step of coarse-tuning the 26 MHz clock signal generated by the oscillator circuit 146 (e.g., based on a pre-set calibration value) may be provided between method steps 502 and 504.

Figure 6:
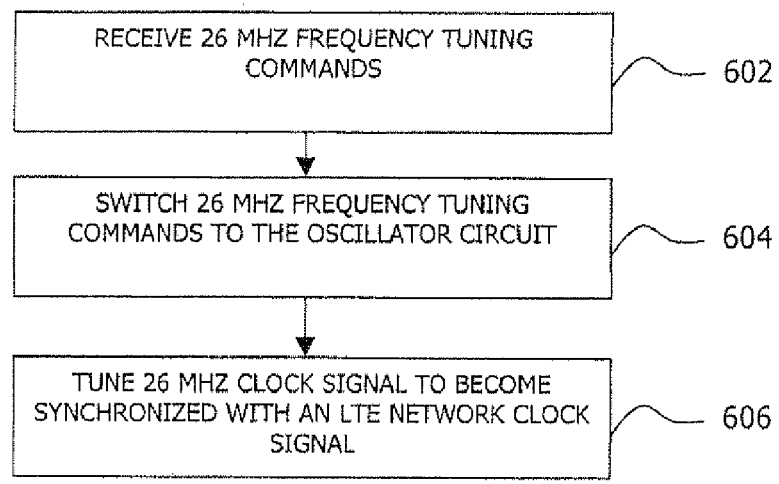
FIG. 6 is a flow chart illustrating an embodiment of a method for synchronizing different network access modules in a mobile communication device when an LTE RAT interface becomes active.

FIG. 6 shows a flow chart 600 illustrating an embodiment of a method for synchronizing different network access modules in a mobile communication device when an LTE RAT interface becomes active. The method will be explained with reference to FIGS. 1 and 2.

In this embodiment, it is assumed that the LTE RAT interface 114 becomes active. This embodiment covers the cases that the CDMA RAT interface 130 becomes inactive or remains inactive.

The method starts in step 602 in that the frequency oscillator unit 106 receives 26 MHz frequency tuning commands from LTE network access module 102. Subsequently, in step 604, the received 26 MHz frequency tuning commands are switched by switching unit 154 via tuning unit 157 to the oscillator circuit 146.

In step 606, the 26 MHz frequency tuning commands tune the 26 MHz clock signal generated by the oscillator circuit 146 to become synchronized with an LTE network clock signal. Subsequently, the tuned 26 MHz clock signals are provided via the first outputting unit 148 to the LTE RF ASIC 116 and via the conversion unit 150 and the second outputting unit 152 to the CDMA RF ASIC 132.

For this, method steps 504, 506 and 508 as explained above with regard to FIG. 5 may be performed. Accordingly, when the LTE RAT interface 114 is active, both the LTE network access module 102 and the CDMA network access module 104 use signals as reference clock signals which are derived from the same clock source and which are tuned to the LTE network clock signal.

Figure 7:
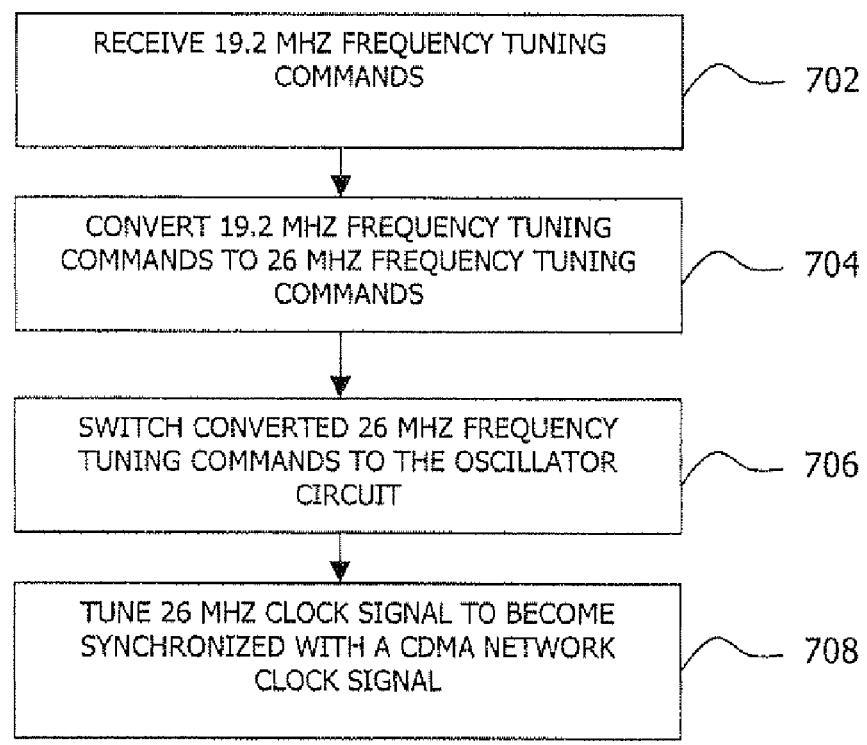
FIG. 7 is a flow chart illustrating an embodiment of a method for synchronizing different network access modules in a mobile communication device when a CDMA RAT interface becomes active.

FIG. 7 shows a flow chart 700 illustrating an embodiment of a method for synchronizing different network access modules in a mobile communication device when a CDMA RAT interface becomes active. The method will be explained with reference to FIGS. 1 and 2.

In this embodiment, it is assumed that the CDMA RAT interface 130 becomes active. This embodiment covers the cases that the LTE RAT interface 114 becomes inactive or remains inactive.

The method starts in step 702 by receiving 19.2 MHz frequency tuning commands from CDMA network access module 104 by frequency oscillator unit 106. Subsequently, in step 704, the received 19.2 MHz frequency tuning commands are converted by conversion logic 156 to 26 MHz frequency tuning commands. The converted 26 MHz frequency tuning commands are thereafter switched in step 706 by switching unit 154 via tuning unit 157 to oscillator circuit 146. In subsequent step 708, the 26 MHz clock signal generated by the oscillator circuit 146 is tuned based on the converted 26 MHz frequency tuning commands to become synchronized with a CDMA network clock signal.

Thereafter, the tuned 26 MHz clock signals are provided via the first outputting unit 148 to the LTE RF ASIC 116 and via the conversion unit 150 and the second outputting unit 152 to the CDMA RF ASIC 132.

For this, method steps 504, 506 and 508 as explained above with regard to FIG. 5 may be performed. Accordingly, when the CDMA RAT interface 130 is active, both the LTE network access module 102 and the CDMA network access module 104 receive their reference clock signals from the same clock source and the reference clock signals are tuned to become synchronized with the CDMA network clock signal.

A further embodiment concerning inter-RAT measurements provided by a mobile communication device will be explained with reference to FIG. 1.

In case the mobile communication device 100 is camped on one of the LTE RAT or the CDMA RAT, inter-RAT measurements are performed by the network access module having the non-camped RAT interface.

For example, in case the mobile communication device 100 is camped on the LTE RAT (i.e., the LTE RAT interface 114 is active), the CDMA network access module 104 uses the clock signal tuned to the LTE network clock signal as its reference clock signal for performing inter-RAT measurements. In case the mobile communication device 100 is camped on the CDMA RAT, the LTE network access module 102 uses the clock signal tuned to the CDMA network clock signal as its reference clock signal for performing inter-RAT measurements. The inter-RAT measurements may comprise measurements on a downlink physical channel of the non-camped network access module.

According to the present technique for synchronizing different network access modules, the time required for executing inter-RAT measurements can be reduced. This is achieved in that the network access module which performs the inter-RAT measurements always uses the reference clock signal generated by the common oscillator circuit. Thus, no clock synchronization time period is required for providing inter-RAT measurements since always the common stable reference clock is used.

Moreover, the smaller time period for providing inter-RAT measurements can be used to minimize a transmission/reception time gap, which has to be inserted at the other network access module to enable disturbance-free measurements. Thus, a higher data throughput in both the sending and the receiving direction is provided at the network access module.

The present technique for synchronizing different network access modules in a mobile communication device is a cost- and space-optimized solution for providing a stable and secure synchronization of different network access modules. The integration effort is minimal since both network access modules provide oscillator control as if they would control their own oscillator circuits. In particular, the LTE network access module provides commands for tuning a 26 MHz clock signal and the CDMA network access module provides commands for tuning a 19.2 MHz clock signal.

Moreover, since a common oscillator circuit is used and the reference clock signals are always stabilized, the time required for executing inter-RAT handover can be reduced. Thus, only a handover of frequency and gain control between the two network access modules has to be provided during inter-RAT handover.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method for synchronizing different network access modules in a mobile communication device, the device comprising a first network access module having a first radio access technology, or RAT, interface and being clocked at a first clock frequency and a second network access module having a second RAT interface and being clocked at a second clock frequency, wherein the first clock frequency is different from the second clock frequency, the method comprising the following steps:
    generating a clock signal having the first clock frequency,
    tuning the clock signal having the first clock frequency to become synchronized with a network clock signal received via one of the first and second RAT interface;
    outputting the clock signal for use as a first reference clock signal in the first network access module,
    converting the clock signal to the second clock frequency, and
    outputting the converted clock signal for use as a second reference clock signal in the second network access module.

2. The method of claim 1, wherein in case the first RAT interface is active, the network clock signal is a network clock signal received via the first RAT interface, and in case the second RAT interface is active, the network clock signal is a network clock signal received via the second RAT interface.

3. The method of claim 2, further comprising:
    obtaining first frequency tuning commands from the first network access module,
    obtaining second frequency tuning commands from the second network access module, and
    selectively using the first or the second frequency tuning commands for the tuning of the clock signal.

4. The method of claim 2, further comprising:
    obtaining first frequency tuning commands relating to the first clock frequency from the first network access module,
    obtaining third frequency tuning commands relating to the second clock frequency from the second network access module,
    converting the third frequency tuning commands to second frequency tuning commands relating to the first clock frequency, and
    selectively using the first or the second frequency tuning commands for the tuning of the clock signal.

5. The method of claim 4, wherein the frequency tuning commands are voltage values and a linear function or a look-up table is used in the step of converting the third frequency tuning commands.

6. The method of claim 3, further comprising:
    determining whether one of the first and the second RAT interface is active,
    using the first frequency tuning commands for the tuning of the clock signal when it has been determined that the first RAT interface is active, and
    using the second frequency tuning commands for the tuning of the clock signal when it has been determined that the second RAT interface is active.

7. The method of claim 3, further comprising:
    obtaining control commands for controlling the selective usage of the first or second frequency tuning commands from the first network access module.

8. The method of claim 1, further comprising:
    coarse-tuning at least one of the clock signal having the first clock frequency and the converted clock signal having the second clock frequency during a start-up phase of the mobile communication device.

9. The method of claim 1, further comprising:
    performing inter-RAT measurements in the first network access module by using the clock signal which has been tuned to the network clock signal received via the second RAT interface.

10. The method of claim 1, wherein the first and the second network access module share at least one antenna, the method further comprising:
    switching between a connection of the first network access module to the at least one antenna and a connection of the second network access module to the at least one antenna.

11. A frequency oscillator unit, comprising:
    a generating unit configured to generate a clock signal having a first clock frequency,
    a tuning unit configured to tune the clock signal having the first clock frequency to become synchronized with a network clock signal received via one of a first and second first radio access technology (RAT) interface;
    a first outputting unit configured to output the clock signal for use as a first reference clock signal in a first network access module having the first RAT interface and being clocked at the first clock frequency,
    a converting unit configured to convert the clock signal to a second clock frequency, and
    a second outputting unit configured to output the converted clock signal for use as a second reference clock signal in a second network access module having a second RAT interface and being clocked at the second clock frequency.

12. The frequency oscillator unit of claim 11, further comprising:
    a switching unit configured to selectively switch first or second frequency tuning commands to the tuning unit.

13. The frequency oscillator unit of claim 12, further comprising:
    conversion logic configured to convert third frequency tuning commands relating to the second clock frequency to the second frequency tuning commands relating to the first clock frequency.

14. A network access module comprising the frequency oscillator unit of claim 11.

15. A mobile communication device, comprising:
    the frequency oscillator unit of claim 11, the first network access module and the second network access module.

* * * * *